(No Model.)
C. L. COFFIN.
PROCESS OF ELECTRIC WELDING.
No. 399,019. Patented Mar. 5, 1889.
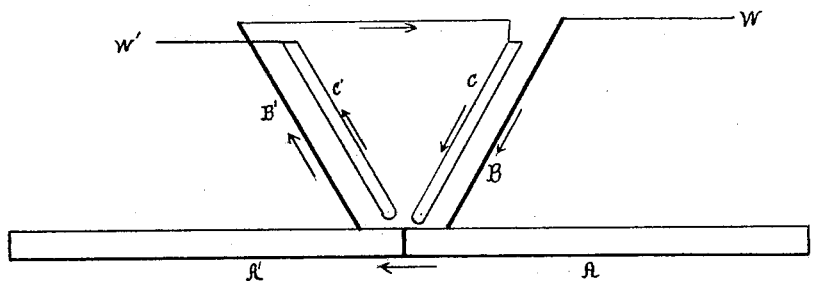
Witnesses,
Adelaide A. Anderson,
Geo. H. Lothrop.
Inventor,
Charles L. Coffin.

UNITED STATES PATENT OFFICE.

CHARLES L. COFFIN, OF DETROIT, MICHIGAN.

PROCESS OF ELECTRIC WELDING.

SPECIFICATION forming part of Letters Patent No. 399,019, dated March 5, 1889.

Application filed September 18, 1888. Serial No. 285,740. (No specimens.)

*To all whom it may concern:*

Be it known that I, CHARLES L. COFFIN, of Detroit, in the county of Wayne and State of Michigan, have invented a new and useful Improvement in the Process of Electric Welding, of which the following is a specification.

My invention consists in the process of electric welding hereinafter fully described and claimed.

The drawing is a diagram illustrating my invention.

A and A' represent the articles to be welded, and C C' represent two carbons or other conductors, between which the voltaic arc which does the welding is sprung.

B B' represent two conductors, which are in electrical contact with the articles A A', respectively, and the current from the generator of electricity is applied as follows: From one pole of the generator the current flows through the wire W and conductor B into the article A, thence into the article A', traversing the joint to be welded, and out through the conductor B'. Thence it passes through the carbon or conductor C, forms the voltaic arc at the lower end of this conductor, passes forward through the other carbon or conductor, C', and thence off to the other pole of the generator through the wire W'.

If desired, two generators may be connected, one with the conductors B B' and the other with the carbons C C', the essence of my invention consisting in simultaneously traversing the joint to be welded by an electric current and subjecting it to the action of a voltaic arc.

Of course the articles A and A' must be insulated in practicing this process.

The arrows indicate the course of the current or currents.

What I claim as my invention, and desire to secure by Letters Patent, is—

The process herein described of welding two articles together, which consists in placing the two articles against each other and welding the joint by simultaneously traversing such joint by an electric current and subjecting it to the action of a voltaic arc, substantially as set forth.

CHARLES L. COFFIN.

Witnesses:
    HENRY A. LOTHROP,
    ADELAIDE A. ANDERSON.